United States Patent [19]

Rosenthal et al.

[11] Patent Number: 5,127,098

[45] Date of Patent: Jun. 30, 1992

[54] METHOD AND APPARATUS FOR THE CONTEXT SWITCHING OF DEVICES

[75] Inventors: David S. H. Rosenthal, Palo Alto; Robert Rocchetti, Cupertino; Curtis Priem, Fremont; Chris Malachowsky, Santa Clara, all of Calif.

[73] Assignee: Sun Microsystems, Inc., Mountain View, Calif.

[21] Appl. No.: 413,976

[22] Filed: Sep. 28, 1989

Related U.S. Application Data

[62] Division of Ser. No. 336,717, Apr. 12, 1989, abandoned.

[51] Int. Cl.⁵ .................................................. G06F 9/46
[52] U.S. Cl. ................................. 395/650; 364/DIG. 1; 364/281.7; 364/246.3; 364/254.3; 364/261.3
[58] Field of Search ............... 364/DIG. 1; 395/650, 395/800

[56] References Cited

U.S. PATENT DOCUMENTS

| | | | |
|---|---|---|---|
| 4,104,718 | 8/1978 | Poublan et al. | 364/DIG. 1 |
| 4,224,664 | 9/1980 | Trinchieri | 364/DIG. 1 |
| 4,394,725 | 7/1983 | Bienvenu et al. | 364/DIG. 1 |
| 4,439,830 | 3/1984 | Chueh | 364/DIG. 1 |
| 4,480,304 | 10/1984 | Carr et al. | 364/DIG. 1 |
| 4,604,694 | 8/1986 | Hough | 364/DIG. 1 |
| 4,761,737 | 8/1988 | Duvall et al. | 364/DIG. 1 |

OTHER PUBLICATIONS

Voorhies et al., "Virtual Graphics", *Computer Graphics*, vol. 22, No. 4 (Aug. 1988).

*Primary Examiner*—Thomas M. Heckler
*Attorney, Agent, or Firm*—Blakely Sokoloff Taylor & Zafman

[57] ABSTRACT

The system of the present invention provides for the context switching of devices connected through the system's memory management unit and is particularly useful in a multi-tasking computer system in which multiple processes access the same device. In the method and apparatus of the present invention, devices that are connected to the system through the MMU are controlled using the page fault mechanism of the MMU and the page fault handler in each segment. Addresses are allocated in the process address space for each process to provide for the addressing of the devices and device queues connected through the MMU, such that one device or one device queue is mapped into one segment of each process address space that will access the device. The "valid bits" associated with each page in a segment are turned on/off by the process or operating system in order to control the device. If the valid bits are off and an attempt is made to access at the address a page fault occurs and the page fault mechanism invokes the page fault handler of the corresponding segment. The page fault mechanism of the MMU and the page fault handler of each segment are then utilized to perform a context switch of the device.

21 Claims, 7 Drawing Sheets

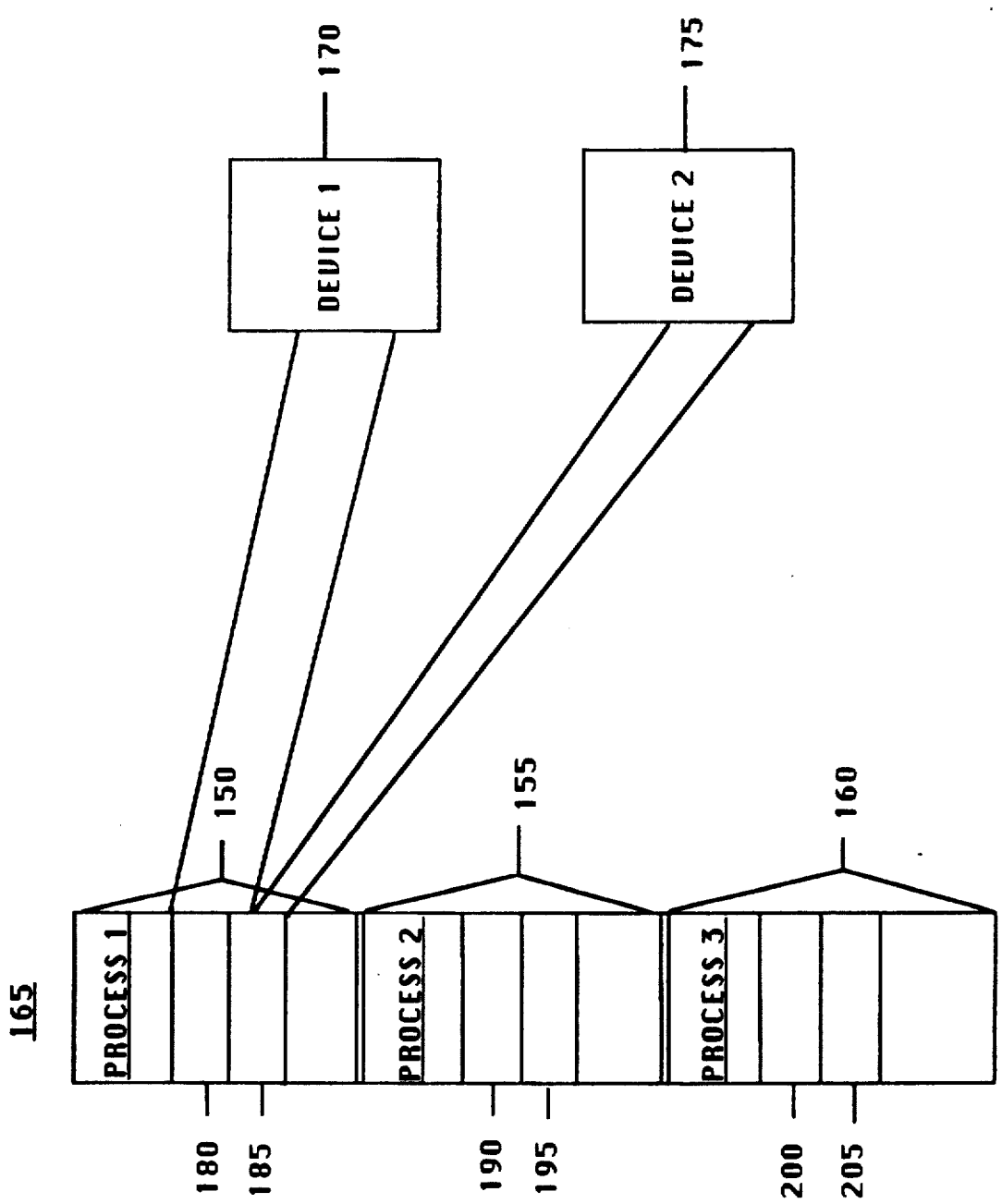

METHOD AND APPARATUS FOR THE CONTEXT SWITCHING OF DEVICES

RELATED APPLICATIONS

This application is a divisional application of U.S. patent application Ser. No. 336,717 filed Apr. 12, 1989, entitled Method and Apparatus for Controlling User Definable Devices, now abandoned.

BACKGROUND OF THE INVENTION

1. Field of the Invention

This invention relates to the time sharing of user defined devices in a multi-tasking computer system and, in particular, to the context switching of user defined devices connected to the system through the memory management unit.

2. Art Background

Computers range in size, features, and capabilities from personal computers to large mainframes. Many computers are capable of multi-tasking; that is, the processes running on the system share the resources of the system, e.g. CPU, co-processor, memory and devices, so that more than one process can be running or appear to be running concurrently. The multi-tasking capability is achieved through the "sharing" (also refered to as "time-sharing") of the resources by the processes. The operating system gives each process a turn to utilize the resources, typically for a predetermined amount of time. When it is another process's turn to utilize the resource, the current process is suspended; and the state of the process is stored until it is the process's turn again to utilize the resource. For example, in some UNIX-based systems, a scheduler allocates the CPU and co-processor, such as a floating point processor (FPU), to processes. It schedules the processes to run in turn until they voluntarily relinquish the CPU and FPU while awaiting another resource or until the operating system preempts the process when the run time exceeds a time quantum.

When the operating system switches the CPU or CPU's (if the system is configured with multiple CPU's from process to process it has to save the state of the process which is not currently running (such a process is referred to as "inactive") so that when the operating system switches the CPU back to run an inactive process (the inactive process thereby becoming "active"), the process will resume its execution at the point it was stopped earlier. The information that needs to be saved and restored in order to resume execution in the same state in which the process was earlier stopped is referred to as the context of the process. When executing a process, the system is said to be executing in the context of the process. Thus, when the operting system determines that it should execute another process, it performs what is referred to as a "context switch" so that the system can execute in the context of the other process. The context switch comprises the steps of saving the context of the active process which had been running at the time of the context switch and restoring the context of the inactive process to be activated so that process will resume at the point it was stopped by an earlier context switch. The context contains such information as the values of the process's global user variables and data structures, the values of machine registers which the process uses, and other data that may be needed to continue the running of the process at a later time.

Context switching is illustrated in the diagram of FIG.1. At time t0, Process1 is active and Processes 2 and 3 are inactive. At time t1, a context switch is performed in which the context of the CPU and FPU with respect to Process1 is stored in the operating system data structure (In a UNIX-based operating system, this data structure typically comprises a system process table and save area.) and the context of the CPU and FPU with respect to Process2 is retrieved from the operating system data structure and restored on the CPU and FPU so that the CPU and FPU resume their execution in the context of Process2. Similarly, at time t2 a context switch is performed in which the context of the CPU and FPU with respect to Process2 is stored in the operating system data structure and the context of the CPU and FPU with respect to Process3 are restored on the CPU and FPU.

The computer systems currently available typically support the CPU and FPU as devices which are time-shared among processes. Thus, the operating system recognizes the two devices and knows what elements comprise the state of the processor to be preserved when context switching is performed. Additional processors or devices are often connected to the system through the memory management unit (MMU) using a well known technique referred to as memory mapped input/output (IO). Each device connected through the MMU has am address state which represents the public state a process can access. The CPU accesses the device using the address in the same manner as if the device were memory.

As the sophistication of computer systems increase, so do the number of specialized devices or processors (hereinafter collectively referred to as "user defined devices") which perform specific, typically time consuming, functions thereby distributing the processing load and increasing the overall processing speed of the system. These user defined devices are typically attached to the system through the MMU. For example, many computer systems utilize graphics processors to perform the time consuming computations required to generate a graphic display or vector processors to perform vector calculations. However, the operating system cannot utilize the same techniques and processes which are used to provide a full multi-tasking capability of the CPU and FPU to provide a multi-tasking capability of the user defined devices because the context and characteristics of each device is different. Thus, the incease in speed provided by the user defined devices is minimized by absence of a time share capability among multiple processes.

Several problems arise when multiple processes access user defined devices which are connected through the MMU. One problem arises with respect to the context switching of the devices. Although multiple processes have access to the same user-defined device, only one process can access the device at a time regardless of what context the kernel is operating in because the kernel does not provide for the context switching of a device connected to the system through the MMU. Thus, a process which accesses a device through the MMU controls the device until it is finished accessing the device.

The problem that arises is best described by example. Two processes, Process1 and 2, are currently running on the system and both process utilize a device such as a vector processor which is connected through the MMU. Process1 has control of the CPU and is the active process. Process1 attempts to access the device first by checking the device lock to see if acess to the device is permitted. If the device lock is set, Process1 is not be able to access the device and has to wait, i.e., go to "sleep", until the device is not locked and Process1 is the active process. If the device lock is not set, Process1 sets the device lock to prevent any other process from accessing the device and loads the device with the context information required for the device to operate with Process1. If a process switch occurs which renders Process1 inactive and Process2 active, when Process2 attempts to access the device, it will discover that the device is locked because Process1 has not finished accessing the device. Thus, Process2 will have to go to sleep until Process1 is finished accessing the device. When Process1 is finished accessing the device, the context information from Process1 is read from the device and stored in a system data struture, such as the save area in the UNIX operating system, and the device is unlocked, thereby permitting other processes to access the device.

Another problem arises when the operating system receives a command from a process to be assembled and subsequently sent to the device to complete execution of the command. The command when assembled may consist of multiple words containing various attributes of the command. Errors occur when control of the CPU switches from a first process to a second process and the entire command had not been transferred to the device. The command is lost because the process does not realize that the complete command was not transferred to the device, and therefore the process will not retransfer the command when the process subsequently has control of the CPU. Furthermore the operating system has no mechanism to save the command which is partially loaded into the device.

Still another problem arises with respect to the control of process flow. To control the flow and execution of a number of commands with respect to a particular device, a queue is typically used to store the commands in sequence and send one command at a time to the device. However, the queue is of a limited size and can overflow, thereby losing those commands which cannot be stored in the overflowed queue. This problem can be decreased somewhat by providing a separate device queue for each process that accesses the device. However, overflow problems can still occur if the process accesses the device frequently.

Serialization and synchronization problems also arise with respect to devices connected through the MMU. Serialization problems occur when a process executes two commands with respect to the same device, and the first command is transmitted through the queue so that it reaches the device after the second command which is not transmitted through the queue. Synchronization problems arise when multiple processes interact with one another and require that one process execute certain commands with respect to a device before another process executes commands. For example, if the device connected through the MMU is a graphics device and Process1 contains commands to load the color table while Process2 contains commands to draw a graphics image, the Process1 command has to be executed prior to the Process2 commands in order that the proper colors are utilized to portray the graphics image.

SUMMARY OF THE INVENTION

It is therefore an object of the present invention to provide a method and apparatus to control devices connected through the memory management unit of a computer system.

It is an object of this invention to provide a method and apparatus which support the context switching of devices connected through the system's memory management unit (MMU) thereby providing multiple user processes the illusion of simultaneous direct access to the device.

It is further an object of the present invention to provide a system of context switching for user-defined devices which minimizes the overhead caused by context switching thereby improving the system performance of a multi-tasking system.

It is an object of the present invention to provide a means for controlling devices connected to the system through the MMU so that the devices do not execute partial commands.

It is an object of the present invention to provide a means for controlling the process flow with respect to devices connected to the system through the MMU.

It is further an object of the present invention to provide a means for controlling command executions with respect to devices connected to the system through the MMU such that serialization and synchronization problems are avoided.

In the method and apparatus of the present invention, devices that are connected to the system through the MMU are controlled using the page fault mechanism of the MMU and page fault handler in each segment. Addresses are allocated in the process address space for each process to provide for the addressing of the devices and device queues connected through the MMU, such that one device or one device queue is mapped into one segment of each process address space that will access the device. The "valid bits" associated with each page in a segment are turned on/off by the process or operating system in order to control the device. If the valid bits are off and an attempt is made to access at the address a page fault occurs and the page fault mechanism invokes the page fault handler of the corresponding segment. The page fault mechanism of the MMU and the page fault handler of each segment are then utilized to determine the reason the page fault occurred with respect to a particular process and the steps to service the page fault.

In one embodiment, the page fault mechanism and page fault handler of each segment are utilized to determine which processes require context switching with respect to certain devices and, in other embodiments, when to perform the context switches in order to minimize the number of context switches performed. When a context switch occurs, the context of the user defined devices with respect to the active process are stored in memory and the context of the user defined devices with respect to the inactive process to be activated are restored on the respective user defined devices so that the device will operate in the context of the inactive process to be activated.

BRIEF DESCRIPTION OF THE DRAWINGS

The objects, features and advantages of the system of the present invention will be apparent from the following detailed description of the preferred embodiments in which:

FIG. 3 illustrates the context switching of user-defined devices in another embodiment of the present invention.

DETAILED DESCRIPTION OF THE INVENTION

Although the system of the present invention applies to multi-tasking computer systems in general, the system will be described in the environment of the UNIX operating system in order to simplify the discussion.

Figure 1:
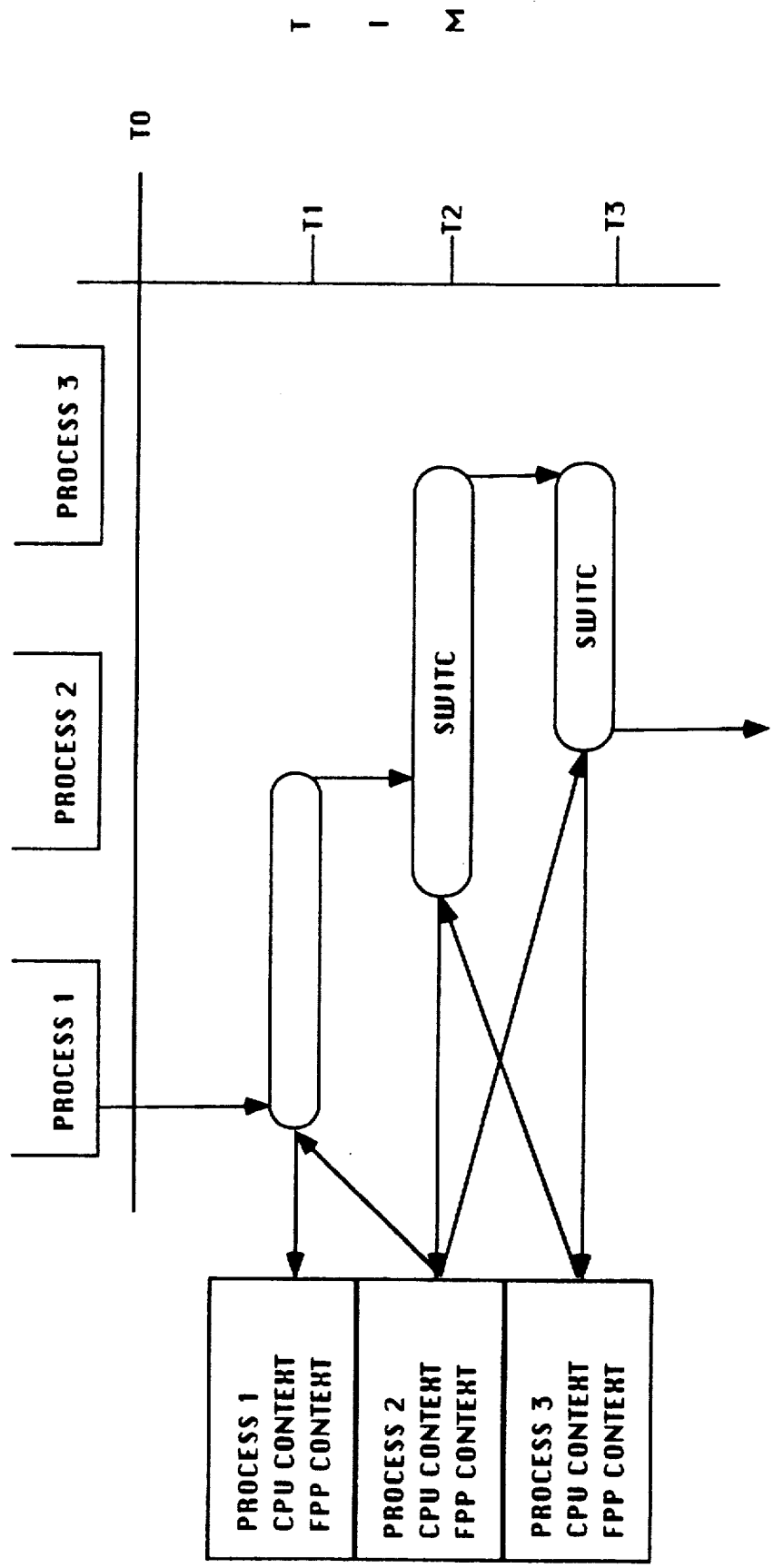
FIG. 1 illustrates the prior art concept of context switching among processes.
Figure 2:
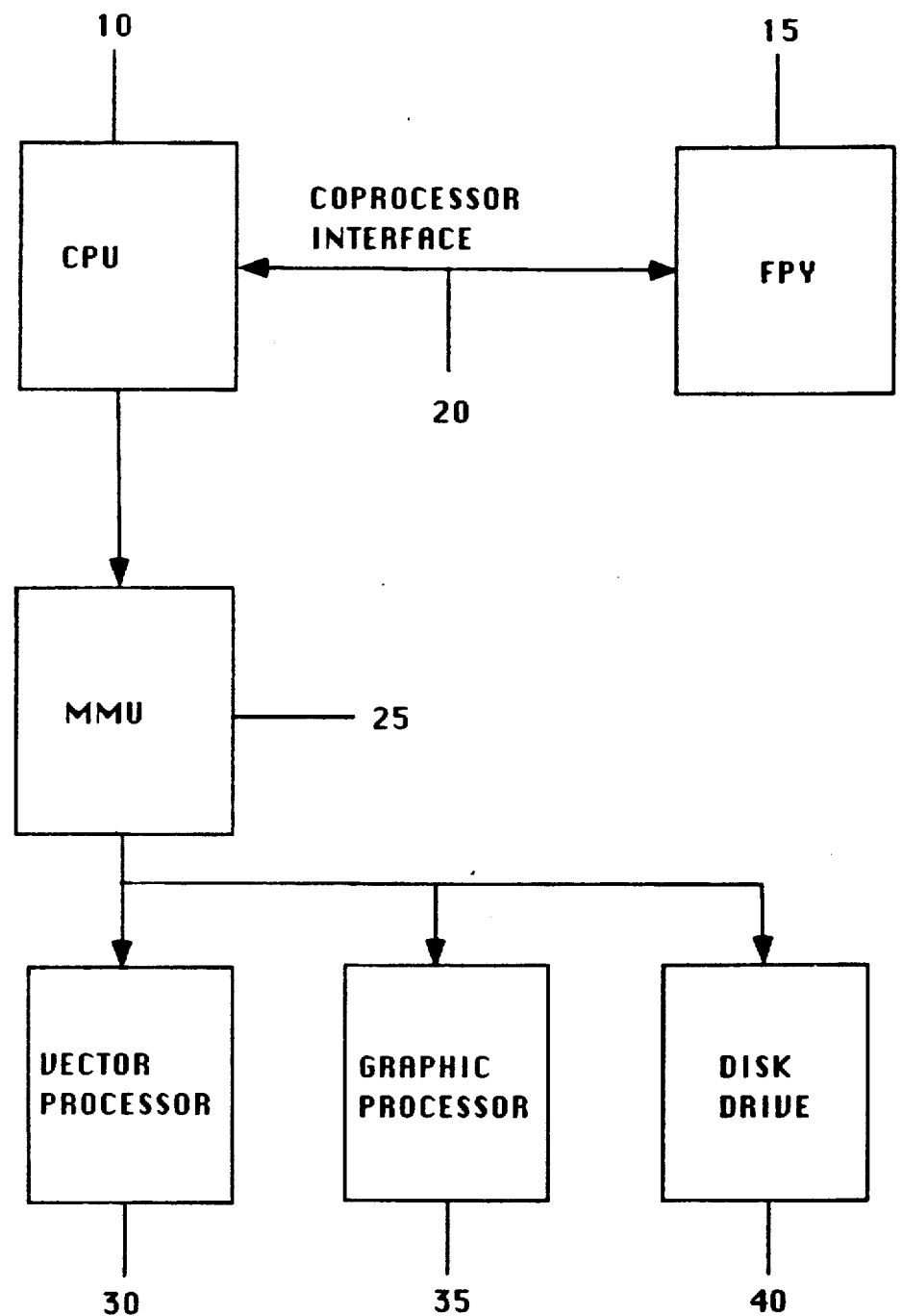
FIG. 2 illustrates the configuration of the system of the present invention.

A representation of a computer system configuration is illustrated in FIG. 2. In the system, the floating point processor (FPU) 15 is connected to the central processing unit (CPU) 10 through a co-processor interface 20. Both the CPU and the FPU are time-shared by the processes that may be operating on the system and the operating system supports the context switching of the FPU as well as the CPU thereby enabling the processors to be time-shared. The remaining devices 30, 35, 40, (the user defined devices) are connected through a memory management unit (MMU) 25. The technique utilized to access these devices 30, 35, 40 connected through the MMU 25 is referred to as memory mapped I/O. Each device has its own address space and processes may access the devices using the particular address space associated with each device.

The devices are mapped into the process address space of each process that will access the device. The devices are mapped in such a manner that one device is mapped per segment of the address space. A segment is a contiguous range of pages having a page fault handler associated with it. The page fault handler is configured to control the device mapped to the segment.

The system of the present invention utilizes the page fault mechanism of the MMU to determine when a context switch of individual user devices is to be performed. Referring to FIG. 3, devices 170 and 175 are connected to the system through the MMU and are mapped into the address space of each of the Process1, 150, Process2, 155, and Process3, 160. The devices 170 and 175 are respectively mapped into two segments 180, 185 of the address space of the first process 150. Similarly, the context of devices 170 and 175 with respect to the second and third processes are respectively mapped into segments 190, 195 and 200, 205 of the address space of Process2 and Process3.

In a virtual memory address system, each page of memory has a "valid bit" associated with it. The valid bit is typically utilized to indicate that a page is currently residing in real or physical memory. This valid bit is utilized in this invention to contol the context switching of the user defined devices connected through the MMU. If a valid bit is not set and a process attempts to access the device, a page fault occurs. When a page fault occurs, the kernel will determine through the page fault mechanism of the MMU and the process table that the page fault occurred at a page that is mapped to a particular device. The page fault handler of the segment in which the page fault occured then indicates to the kernel the steps to be taken in response to the page fault. Upon the completion of those steps, the valid bits of the pages to which the device is mapped are set, permitting access to the device by the process, and the instruction on which the page fault occurred is reexecuted or continued to restart the execution of the process.

If the system utilizes device queues which receive commands from the processes and sends the commands to the device, device queues, rather than the device themselves, are mapped into each process address space that accesses the device such that one device queue is mapped into one segment and the valid bits corresponding to the device queues with respect to particular processes are set and reset to invoke the page fault meechanism and control the devices.

In the first embodiment of the present invention, the valid bits of the pages the devices are mapped to are initially not set. Thus, when a process first attempts to access a device a page fault occurs. The MMU determines that the page fault occured at a page which is mapped to a device, and the page fault handler of the corresponding segment is invoked. The page fault handler causes a context switch to be performed, the kernel causing the context information to be restored into the device for the process attempting to access the device. This page fault further indicates to the kernel that a context switch is to be performed wherein the context of the device is read from the device and stored in the save area of the process (in the UNIX operating system this is referred to as the u-area of the process) each time the present process is deactivated and is restored to the device each time the process is activated. The corresponding valid bits are then set so no further page faults occur when the process attempts to subsequently access the device. Process execution is then continued by reexecuting the instruction on which the page fault occured.

In a second embodiment of the present invention to control context switching of devices, the valid bits are initially not set for the pages to which the devices are mapped. Thus, when a process first attempts to access a device, a page fault occurs. The MMU, through the process table, determines that the page fault occured at a page which is mapped to a device; and the page fault handler of the corresponding segment is invoked. At this time a context switch is performed, the kernel causing the context information with respect to the process attempting to access the device to be restored into the device. The page fault handler further indicates to the kernel that a context switch is to be performed in which the context of the device is saved when the process is deactivated (that is, when another process gains access to the CPU). The valid bits corresponding to the mapping of the device within the address space of the process are then set, and process execution is continued. Thus, when the process is subsequently deactivated, a context switch is performed; and the corresponding valid bits are reset. Similarly, the next time a process attempts to access the device in a subsequent CPU cycle, a page fault will occur, a context switch will be performed in which the context will be restored on the device and the valid bits will be set. A context switch will occur wherein the device context is saved and the valid bits will be reset when the process is again deactivated. If the process does not attempt to access the device during the CPU cycle it is active, not page fault will occur and no context switch will be performed. This embodiment decreases the amount of context switching to be performed, limiting context switching only to those processes during which the process actually accesses the device.

In another embodiment of the present invention to control context switching of devices, the valid bits of the pages to which the devices are mapped are initially not set. Thus when a process attempts to access a device, a page fault occurs. It is then determined which process's context is stored on the device. Preferably the kernel determines which device context is on the device. If the device context on the device is that of the process which is attempting to access the device, no context switch is performed, the corresponding valid bits are set and process execution is resumed with the device context stored on the device.

If the device context is not in the context of the process attempting to access the device, a context switch is performed wherein the device context with respect to the process attempting to access the device is restored on the device. The corresponding valid bits are then set and process execution is resumed. When the next process switch occurs and the process which had been accessing the device loses control of the CPU (i.e., the process is "deactivated"), a context switch is performed in which the context of the device is saved and the corresponding valid bits are set. This embodiment is a preferable optimization because a context switch is performed only when the context on the device is not the context of the device with respect to the process trying to access the device.

In another embodiment of the present invention to control context switching of devices connected to the system through the MMU, the valid bits corresponding to device mappings initally are not set for each process. When a process attempts to access a device, a page fault occurs which triggers a context switch wherein the device context with respect to that process is read into the device. When the process is deactivated, no context switch occurs and the valid bits remain set for that process. When another process attempts to access the device a page fault will occur. Then, a context switch is performed wherein the context contained in the device is written into the first process's (that is the process which accessed the device last) save area for storage and the context information with respect to the process attempting to access the device is read into the device. The valid bits corresponding to the device mapping in the first process are reset and the valid bits corresponding to the device mapping in the process, the context of which is currently in the device, are set. Utilizing this process, the amount of context switching with respect to user defined devices connected through the MMU is further minimized.

Figure 4A:
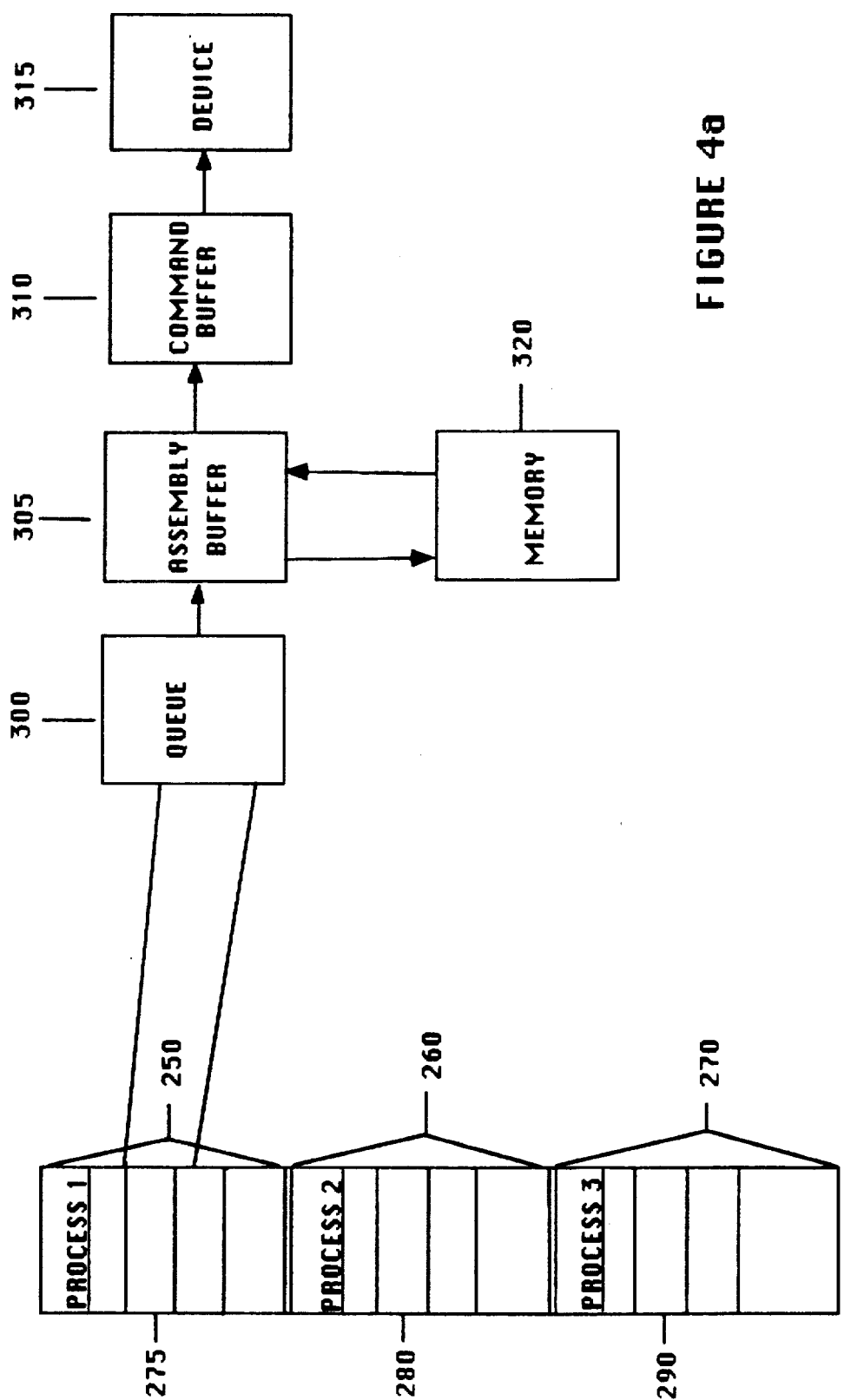
FIG. 4a, 4b illustrates additional embodiment of the present invention which utilizes a device queue, assembly buffer and command buffer.

In another embodiment of the present invention, illustrated in FIG. 4a, the page fault machanism of the MMU and the page fault handler in each segment are used to insure that only complete commands, i.e. not partial commands, are sent to devices connected to the system through the MMU. Device 315 is connected to the system through the MMU. The device queue 300 is mapped into each of Process1 250, Process2 260 and Process3's 270 address space. The device queue 300 with respect to Process1 is mapped into segment 275 contained within Process1's address space 250. Similarly, device queue 300 is mapped into segment 280 of Process2's address space 260 and segment 290 of Process3's address space 270. The device queue 300 is connected to assembly buffer 305 which stores a partial command until it is complete. When the command is complete it is transferred to the command buffer 310 to be input to the device 315. A memory 320 is used to store the contents of assembly buffer 305 when a process switches control of the CPU from one process to another occurs.

If Process1 is the active process, the valid bits corresponding to the mapping of device queue 300 are set, that is, the valid bits of segment 275 are set, and the valid bits corresponding to the mapping of the device queue in Process2 and Process3's address space, that is segments 280 and 290, are not set. When a process switch occurs, for example, control of the CPU is changed from Process1 to Process2 and Process2 attempts to access the device through device queue 300, a page fault occurs and the page fault mechanism using the page fault handler associated with segment 280 is invoked. The page fault mechanism stores the contents of assembly buffer 305 in device memory 320 restores from device memory the contents of assembly buffer 305 with respect to Process2, resets the valid bits corresponding to the mapping, segment 275, of device queue 300 in Process1, and sets the valid bits segment 280 the segment to which device queue is mapped with respect to Process2 whereby Process2 execution is continued and the assembly of the command which is partially stored in the assembly buffer is continued. There are two extensions to this technique. First, the device may store partial commands on the device itself. In such a case, the role of the page handler is to communicate to the device when the context switch occurs, instruct the device as to which process context it should use to save the current partial command, and instruct the device as to which process context to use to install the partial command for the process about to become active. Second, the device may store partial commands on the device itself, but the page handler may still be responsible for the situation where the number of candidate processes exceeds the capacity of the device to save context. The page handler may, in such a case, manage the contexts on the device, storing the least recently used context with its partial command to the save area.

Figure 4B:
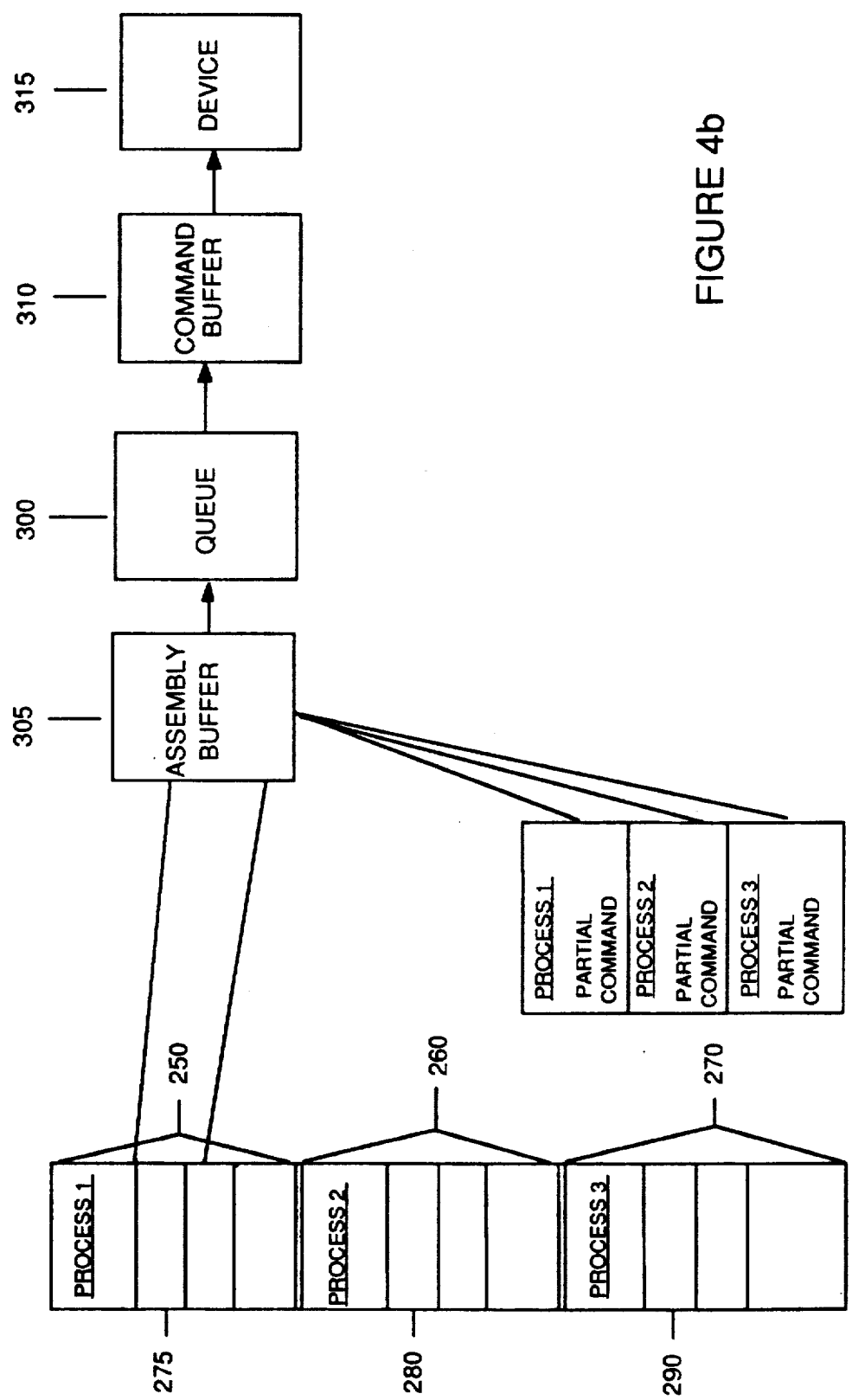

To ensure that only complete commands are executed by the device, the page fault mechanism does not require the device memory to store the partial command. This is illustrated in FIG. 4b. The device 315 is connected to the system through the MMU. The assembly buffer 305 is mapped into each Process1 250, Process2 260, and Process3's address space 270. The assembly buffer 305 with respect to Process1 is mapped into segment 275 contained within Process1's address space 250. Similarly, assembly buffer 300 is mapped into segment 280 of Process2's address space 260, and segment 290 of Process3's address space 270. The assembly buffer 305 is connected to the device queue 300, which connects to the command buffer 310. The command buffer 310 transfers complete commands to the device 315.

If Process1 is the active process, the valid bits corresponding to the mapping of assembly buffer 305 are set, that is, the valid bits of segment 275 are set, and the valid bits corresponding to the mapping of the assembly buffer in Process2 and Process3's address space are not set. When a process switch occurs, for example, when control of the CPU is changed from Process1 to Process2 and Process2 attempts to access the device through assembly buffer 305, a page fault occurs and the page fault mechanism using the page fault handler associated with segment 280 is invoked.

The page fault mechanism stores the contents of the assembly buffer 305 in the save area 320 for the process, restores the contents of assembly buffer 305 with respect to Process2 from its save area, resets the valid bits corresponding to the mapping, segment 275, of assembly buffer 305 in Process1, and sets the valid bits segment 280, the segment to which the assembly buffer is mapped with respect to Process2, whereby Process2 execution is continued and the assembly of the command which is partially stored in the assembly buffer is continued.

As can be visualized by reading the foregoing description, this embodiment may be varied to change the time when the contents of the assembly buffer are saved and when the contents are restored such as with embodiments earlier described with respect to context switching of the devices. In addition, this embodiment may be combined with the previous embodiments such that when the device context is stored the contents of the assembly buffer are stored and when the device context is restored, the contents of the assembly buffer are restored.

The page fault mechanism of the MMU may also be utilized to control the process flow to the devices connected to the system through the MMU. Flow control problems arise when the device queue is filled to capacity and overflows, losing those commands that were not stored in the queue. In the present embodiment, the valid bits corresponding to the mapping of the device queue with respect to the active process (the process which currently has control of the CPU) are set thereby permitting access to the queue to enqueue commands without the occurence of a page fault. When the queue reaches a certain capacity, for example 90% full, a signal is sent, which indicates that the buffer is full. Unpon receipt of the notice the buffer is full, the operating system resets the valid bits corresponding to the mapping of the device queue. Therefore, the next time the queue is accessed, a page fault occurs and the page fault mechanism of the MMU causes the process which was attempting to access the queue to go to sleep. When the queue reaches a certain level that designates that the queue is no longer full (e.g. 10% full), a signal is sent to the operating system which causes the corresponding valid bits to be set indicating that access to the queue is permitted and any processes which were put to sleep because the device queue was full are awakened. Preferably, the signals that the queue is full and the queue is no longer full are sent using the interrupt mechanism of the CPU. For example, when the queue is full an interrupt is generated. The interrupt handler determines that the interrupt was generated because the device queue is full and forwards a signal to the page fault handler of the segment to which the device queue is mapped. The page fault handler then resets the valid bits. Similarly, when the queue is no longer full, an interrupt is generated and examined by the interrupt handler which passes a signal to the page fault handler to set the valid bits of the segment, thereby permitting access to the device queue.

Figure 5A:
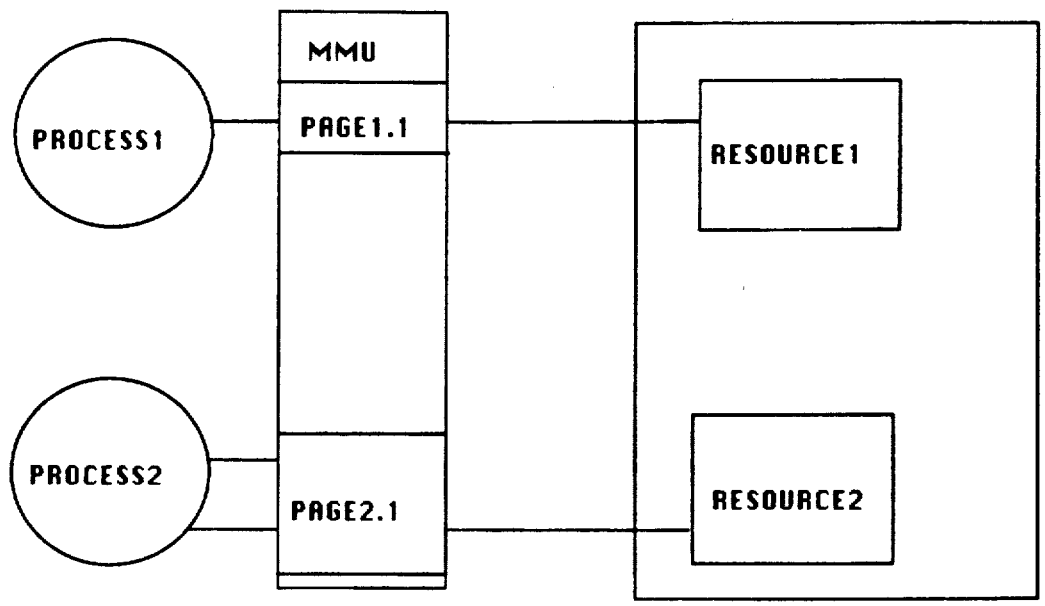
FIG. 5a, 5b illustrates a method to achieve synchronization.

FIG. 5a illustrates a first variation of the use of the memory management module for implementing synchronization. In this example it is assumed that there are processes which access resources on the device, each of whcih is private to the process. A specific example might be a client process called Process1 which owns a device queue called resource1, and window software called Process2 which owns a color table called resource2. The client process instructs the window process to write the color table. The window process is to complete this transaction before the client process is to access the device. In the example shown in FIG. 5, Process1 maps resource1 through page1.1, and Process2 maps resource1 to page2.1. In this first example of synchronization, the window process calls system software, called the device driver, to communicate its interest in accessing the device. device driver is system software specific to a device. The example illustrates the use of the device driver to signal or transfer control to the page handler without incurring a page fault to control access to the device.

The following table with the description following will illustrate the operation of the variation shown in FIG. 5a.

| TIME | PROCESS | PAGE | RESOURCE | OWNERSHIP | PERMISSIONS | VALID |
| --- | --- | --- | --- | --- | --- | --- |
| t1 | Process1 | page1.1 | resource1 | private | read/write | 1 |
| t1 | Process2 | page2.1 | resource1 | private | read/write | 1 |
| t3 | Process1 | page1.1 | resource1 | private | read/write | 0 |
| t3 | Process2 | page2.1 | resource1 | private | read/write | 1 |
| t5 | Process1 | page1.1 | resource1 | private | read/write | 1 |
| t5 | Process2 | page2.1 | resource1 | private | read/write | 1 |

As may be seen, at time t1, Process1 which owns resource1 requests that Process2 which owns resource2 modify resource2. In this operation, Process2 is to complete this transaction on resource2 before Process1 is to access resource1. At time t2, Process2 call the device driver to request exclusive accessive to the device. The device driver in turn conveys this request and transfers control to the page handler. At time t3, the page handler implements the request for exclusive access. The page handler either a) invalidates all the pages for all processes which access the device except for the window process itself (thus the page1.1 for resource1 becomes invalid); or b) invalidates just the pages of those processes which access the device and require this specific resource. These are examples where window software must modify device state with affects just one process. At time t4, Process2 resumes and completes the transaction. The transaction is atomic because no process, except Process2, can access the device. To signal that the transaction is complete, Process2 again calls the device driver to release exclusive access to the device. The device driver conveys this request to the page handler. At time t5 the page handler releases exclusive access. The page handler validates page1.1 for resource1. The client process, Process1 becomes active and resumes access to the device.

Figure 5B:
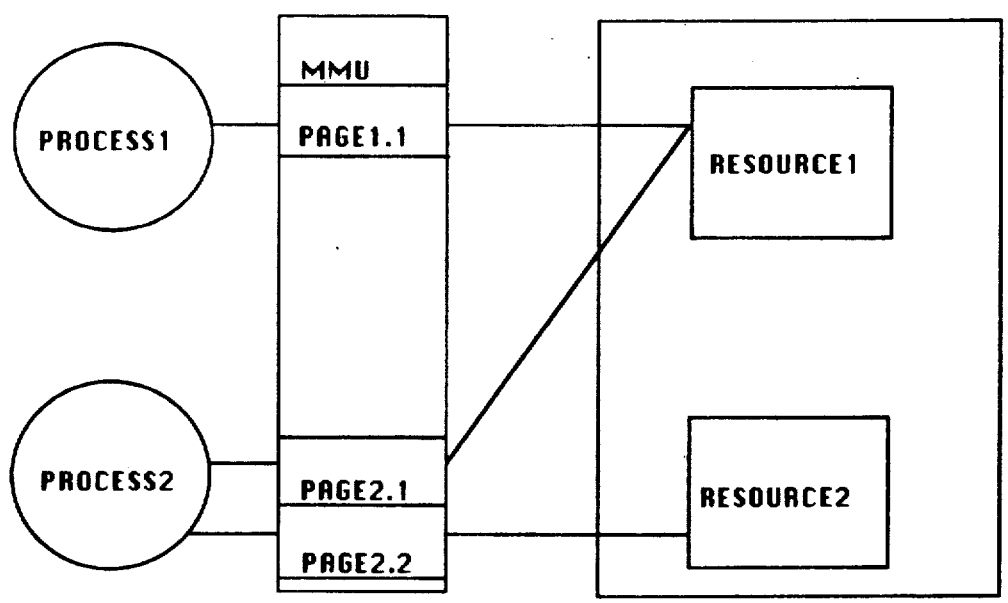

FIG. 5*b* illustrates another use of the memory management module for implementing synchronization. In the situation illustrated in FIG. 5*b*, the page address for a device resource functions as a semaphore by causing a page fault and invoking the page fault mechanism. In this example it is assumed that there are processes which access resources, each of which is private to the process, on the device. The example again assumes there is a client process called Process1 which owns a device queue called resource1, and window software called Process2 which owns a color table called resource2. The client process instructs the window process to write the color table. The window process is to complete this transaction before the client process is to access the device. In the example shown in FIG. 5*b*, it is assumed that Process1 maps resource1 through page1.1, that Process2 maps resource1 through page2.1, and that Process2 maps resource2 through page2.2. It should be noted that the page handler is able to determine which process causes the page fault.

Similarly, if one process must execute before a second process, the first process is assigned a higher priority and the valid bits corresponding to the mapping of a device with respect to the second process are reset such that if the second process attempts to access the device before the first process, a page fault occurs and the page fault mechanism will cause the process to go to sleep until the valid bits are set. Once the first process has completed access to the device, the valid bits corresponding to the mapping of the device with respect to the second process are reset and the process is awaken thereby permitting the second process to access the device.

The following table with the description following will illustrate the operation of the variation shown in FIG 5*b*.

The page handler either a) invalidates all the pages for all processes which access the device except for the window process itself (thus the page1.1 for resource1 becomes invalid); or b) invalidates just the pages of those processes which access the device and require this specific resource. These are examples where window software must modify the device state which affects just one process. Finally at t3, the page handler validates the page2.2 for resource2. At time t4, the Process2 resumes and completes the transaction. The transaction is atomic because no process, except Process2, can access the device. To signal that the transaction is complete, Process2 attempts to read resource1. Since the system software initializes the page table for this resource, page2.1, as invalid, the attempt causes the page fault. At time t5, the page handler recognizes that, because the request to access resource1 originates from Process2 rather than Process1, it should interpret the page fault to mean that it is to release exclusive access. The page handler then invalidates page2.2 for resource2 and validates page1.1 for resource1. The client process, Process1 becomes active and resumes access to the device.

Figure 6:
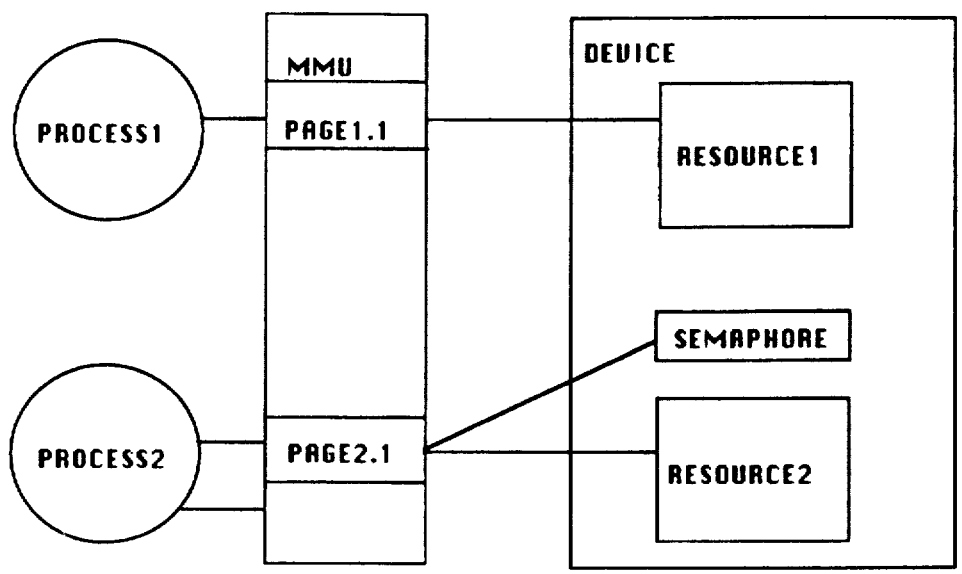
FIG. 6 illustrates another method to achieve synchronization.

FIG. 6 illustrates a third example which again uses the page table to deny access until the transaction is complete. In this example, it is assumed that the hardware signals the system software using a semaphore. The device interrupts the system software when the window software writes a semaphore on the device. The table and the explanation given below illustrate the operation of the example shown in FIG. 6.

| TIME | PROCESS | PAGE | RESOURCE | OWNERSHIP | PERMISSIONS | VALID |
|---|---|---|---|---|---|---|
| t1 | Process1 | page1.1 | resource1 | private | read/write | 1 |
| t1 | Process2 | page2.1 | resource1 | private | read/write | 1 |
| t3 | Process1 | page1.1 | resource1 | private | read/write | 0 |
| t3 | Process2 | page2.1 | resource1 | private | read/write | 1 |
| t5 | Process1 | page1.1 | resource1 | private | read/write | 1 |
| t5 | Process2 | page2.1 | resource1 | private | read/write | 1 |

As is illustrated by the table, at time t1, Process1 which owns resource1 requests that Process2 which owns resource2 modify resource2. Process2 is to complete this transaction on resource2 before Process1 is to access resource1. At time t2 Process2 writes the semaphore on the device. The device, through the handler,

| TIME | PROCESS | PAGE | RESOURCE | OWNERSHIP | PERMISSIONS | VALID |
|---|---|---|---|---|---|---|
| t1 | Process1 | page1.1 | resource1 | private | read/write | 1 |
| t1 | Process2 | page2.1 | resource1 | | read | 0 |
| t1 | Process2 | page2.2 | resource2 | private | read/write | 0 |
| t3 | Process1 | page1.1 | resource1 | private | read/write | 0 |
| t3 | Process2 | page2.1 | resource1 | | read | 0 |
| t3 | Process2 | page2.2 | resource2 | private | read/write | 1 |
| t5 | Process1 | page1.1 | resource1 | private | read/write | 1 |
| t5 | Process2 | page2.1 | resource1 | | read | 0 |
| t5 | Process2 | page2.2 | resource2 | private | read/write | 0 |

As may be seen, at time t1, Process1 which owns resource1 requests that Process2 which owns resource2 modify resource2. In this operation, Process2 is to complete this transaction on resource2 before Process1 is to access resource1. At time t2, Process2 attempts to access resource2. In the present example the system software initializes the page table for resource2 as invalid, and a page fault occurs. At time t3, the page handler interprets the page fault for this resource to imply the window software wants exclusive access to the device.

interrupts the system software and transfers control to the page handler. At time t3, the page handler reads the semaphore value, for example, a value of 0 or 1 to determine what response is necessary. The semaphore state indicates that the window software wishes exclusive access to the device. The page handler either a) invalidates all the pages for all the processes which access the device (thus the page1.1 for resource1 becomes invalid);or b) invalidates just the pages for those processes which access the device but explicitly relate to this resource (so that page1.1 for resource1 becomes in- The following table and the explanation will illustrate the operation of the variation shown in FIG. 7.

| TIME | PROCESS | PAGE | RESOURCE | OWNERSHIP | PERMIS-SIONS | VALID |
|---|---|---|---|---|---|---|
| t1 | Process1 | page1.1 | resource1 | public | read/write | 1 |
| t1 | Process1 | page1.2 | semaphore | public | read/write | 1 |
| t1 | Process1 | page1.3 | semaphore | public | read/write | 0 |
| t1 | Process2 | page2.1 | resource1 | public | read/write | 1 |
| t1 | Process2 | page2.2 | semaphore | public | read/write | 0 |
| t1 | Process2 | page2.3 | semaphore | public | read/write | 1 |
| t2 | Process1 | page1.1 | resource1 | public | read/write | 1 |
| t2 | Process1 | page1.2 | semaphore | public | read/write | 1 |
| t2 | Process1 | page1.3 | semaphore | public | read/write | 0 |
| t2 | Process2 | page2.1 | resource1 | public | read/write | 1 |
| t2 | Process2 | page2.2 | semaphore | public | read/write | 0 |
| t2 | Process2 | page2.3 | semaphore | public | read/write | 1 |
| t3 | Process1 | page1.1 | resource1 | public | read/write | 1 |
| t3 | Process1 | page1.2 | semaphore | public | read/write | 0 |
| t3 | Process1 | page1.3 | semaphore | public | read/write | 1 |
| t3 | Process2 | page2.1 | resource1 | public | read/write | 1 |
| t3 | Process2 | page2.2 | semaphore | public | read/write | 1 |
| t3 | Process2 | page2.3 | semaphore | public | read/write | 0 |
| t4 | Process1 | page1.1 | resource1 | public | read/write | 1 |
| t4 | Process1 | page1.2 | semaphore | public | read/write | 0 |
| t4 | Process1 | page1.3 | semaphore | public | read/write | 1 |
| t4 | Process2 | page2.1 | resource1 | public | read/write | 1 |
| t4 | Process2 | page2.2 | semaphore | public | read/write | 1 |
| t4 | Process2 | page2.3 | semaphore | public | read/write | 0 |
| t5 | Process1 | page1.1 | resource1 | public | read/write | 1 |
| t5 | Process1 | page1.2 | semaphore | public | read/write | 1 |
| t5 | Process1 | page1.3 | semaphore | public | read/write | 0 |
| t5 | Process2 | page2.1 | resource1 | public | read/write | 0 |
| t5 | Process2 | page2.2 | semaphore | public | read/write | 0 |
| t5 | Process2 | page2.3 | semaphore | public | read/write | 0 |
| t6 | Process1 | page1.1 | resource1 | public | read/write | 1 |
| t6 | Process1 | page1.2 | semaphore | public | read/write | 1 |
| t6 | Process1 | page1.3 | semaphore | public | read/write | 0 |
| t6 | Process2 | page2.1 | resource1 | public | read/write | 1 |
| t6 | Process2 | page2.2 | semaphore | public | read/write | 0 |
| t6 | Process2 | page2.3 | semaphore | public | read/write | 1 | valid).

At time t4, the Process2 resumes and completes the transaction. The transaction is atomic because no process except Process2 can access the device. To signal that the transaction is complete, Process2 again writes the semaphore on the device. The device interrupts the system software and control is transfered to the page handler. At time t5, the page handler reads the semaphore to detect what response is appropriate. The semaphore indicates that the transaction is complete, and the page handler validates page1.1 for resource1. The client process, Process1, becomes active and resumes access to the device.

Figure 7:
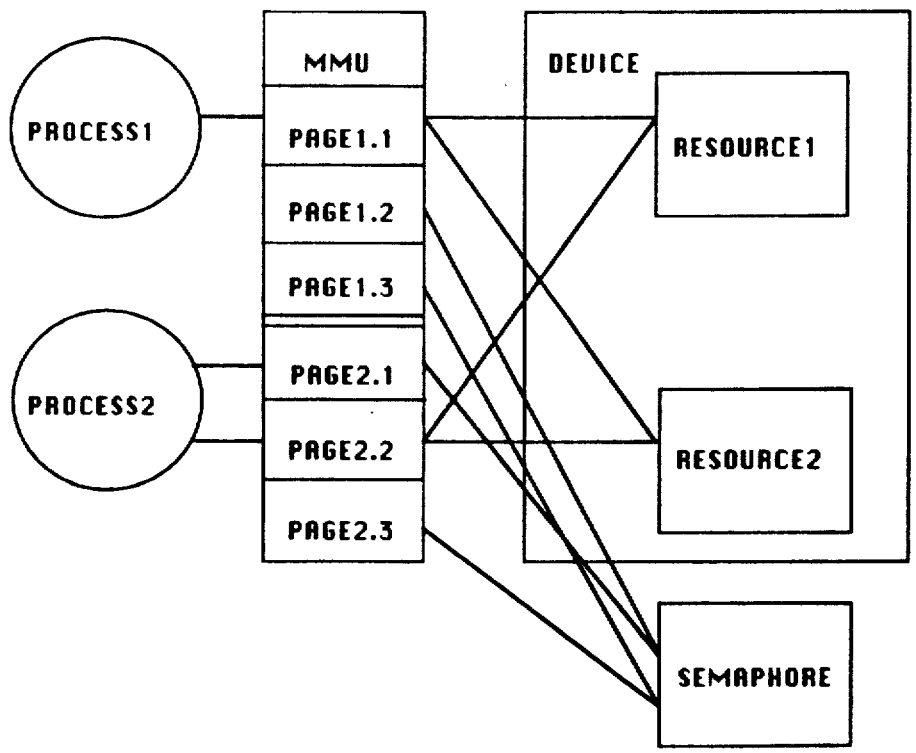
FIG. 7 illustrates another method to achieve synchronization.

FIG. 7 illustrates a fourth example of the page fault mechanism implementing synchronization. It is assumed that the resources on the device are public resources. Once a process acquires a resource, the process must complete execution relative to this resource before a second process can access the resource; otherwise the second process could interfere with the first. Specifically, it is assumed in FIG. 7, that both Process 1 and Process2 use resource1 wherein process1 maps resource1 through page 1.1 while process2 maps resource1 through page2.1. In this example the semaphore is mapped through the page table for each process wherein process1 acquires the semaphore through page1.2 and releases the semaphore through addressing page1.3, while process2 acquires the semaphore through page2.2 and releases the semaphore through page2.3. Thus, each process must acquire the semaphore to reserve this resource and later release the semaphore to free the resource.

As illustrated by the table above, at time t1, Process1 which shares resource1 requests that Process2 to modify resource1. Process2 must complete this transaction on resource1 before Process1 is to access resourse1. At time t2, Process2 attempts to access the semaphore, but since the system software initializes the semaphore page2.2 as invalid, a page fault occurs. At time t3, the page handler allocates resource1 to Process2. The page handler validates the page2.2 and invalidates page2.3 for the window process, and validates page1.3 and invalidates the page1.2 for the client process. At time t4, the Process2 resumes and completes the transaction. The transaction is atomic because Process1 is to attempt to access the semaphore before it is to access the device. To signal that the transaction is complete, Process2 attempts to read the semaphore through page2.3. Since the system software has initialized the page as invalid, the attempt causes the page fault. At time t5, the page handler interprets the attempt to access the semaphore through page2.3, to mean the transaction is complete. The page handler validates page2.2 for Process2, validates page1.2 and invalidates page2.3 for Process1. At time t6 Process1 becomes active and attempts to acquire the semaphore. Since the page is valid, the process remains access to the device.

The invention has been described in conjunction with the preferred embodiments. Numerous alternatives, modifications, variations and uses will be apparent to those skilled in the art in light of the foregoing description. Particularly it is evident that one or more of the embodiments described may be utilized by itself or in conjunction with one another to achieve the system described.

What is claimed is:

1. A multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one device which is connected to the system through a memory management unit (MMU), said device being mapped into the process address space of each process which may access the device, said process address space comprising pages which are grouped into segments, each of said pages having a corresponding valid bit that invokes a page fault if the bit is not set and an attempt is made to access the address space, each of said segments having a page fault handler associated with it which is invoked when a page fault occurs in the segment, said system further comprising a means for controlling the context switching of said device comprising:

means for mapping the device in each process address space such that each device is mapped into a separate segment whereby processes access the device through the address the device is mapped to in its address space;

means for initializing the page fault handler to perform a context switch of the device when a page fault occurs, wherein the context currently in the device is saved and the context of the device with respect to the process attempting to access the device when the page fault occured is restored on the device, and the corresponding valid bits of the process attempting to access the device are set whereby the process attempting to access the device can access the device and the device resumes execution in the context of the process which attempted to access the device;

means for setting and resetting the valid bits of the pages in each of the segments located in the process address space to which the device is mapped, said means comprising;

means for initially setting the valid bits of the pages of the segment corresponding to a first process executed by the CPU; and means for resetting the corresponding valid bits of a process currently executed by the CPU when a process switch occurs whereby the process will cause a page fault when an attempt is made to access the device;

means for determining that a page fault occurs because a process has attempted to access a device mapped in its address space and the corresponding valid bits are reset thereby invoking the page fault handler;

whereby the device and access to the device are controlled by setting and resetting the valid bits of the pages to which the device is mapped such that when a process attempts to access the device and the corresponding valid bits are reset, a page fault occurs and the page fault handler is invoked which performs a context switch of the device.

2. A multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one device which is connected to the system through a memory management unit (MMU), said device being mapped into the process address space of each process which may access the device, said process address space comprising pages, each page having a corresponding valid bit that invokes a page fault if the bit is not set and an attempt is made to access the address space, said system further comprising a means for providing the time sharing of the user defined device, said means comprising:

means for mapping the device in each process address space in a manner that each device is mapped into at least one page;

means for resetting the corresponding valid bits of the pages of each of the process address space to which the device is mapped;

means for determining that a page fault occurs because a process has attempted to access a device mapped to a page in a process address space and the corresponding valid bit is reset;

means for performing a context switch of the device when a page fault occurs due to a process attempting to access a device and the corresponding valid bit is reset, said means comprising;

means for restoring on the device the context of the device with respect to the process attempting to access the device;

means for setting the corresponding valid bit of the process attempting to access the device such that subsequent attempts to access the device by the process do not cause a page fault;

whereby the process attempting to access the device can access the device and the device resumes execution in the context of the process which attempted to access the device.

3. The multi-tasking system of claim 2 wherein said means for performing a context switch further comprises a means for reading the context in the device which is not the context of the device with respect to the process attempting to access the device and storing the context.

4. The multi-tasking system of claim 3, said means for performing a context switch of the device further comprises:

means for performing a context switch when a process switch occurs comprising;

if the process is a process that is executed by the CPU prior to the process switch, means for saving the context of the device with respect to the process; and if the process is a process that is executed by the CPU after the process switch, when the process switch occurs means for restoring on the device the context of the device with respect to the process;

means for resetting the corresponding valid bits of the pages of the process address space to which the device is mapped of the process that is executed by a CPU prior to the process switch.

5. The multi-tasking system of claim 2 wherein the means for performing a context switch of a device further comprises:

means for saving the context of the device with respect to the process which is executed by the CPU prior to the process switch, when the next process switch occurs and the process is no longer executed by the CPU; and means for resetting the valid bits of the pages of the process address space to which the device is mapped of the process which is executed by the CPU prior to the process switch, when the next process switch occurs and the process is no longer executed by the CPU, such that subsequent attempts to access by the process cause a page fault.

6. The multi-tasking system of claim 5, wherein the means for restoring on the device comprises means for controlling, such that the context of the device with respect to the process attempting to access the device is restored on the device only if the device context currently on the device is not the device context with respect to the process attempting to access the device.

7. The multi-tasking system of claim 2 further comprising:

means for grouping pages according to segments, wherein said means for mapping further comprises a means for mapping in such a manner that each device is mapped into one segment; and wherein said means for performing a context switch of the device when a page fault occurs due to a process attempting to access a device comprises a page fault handler, associated with each segment, said page fault handler controlling the context switch for the device.

8. The multi-tasking system of claim 2, wherein the means for performing a context switch further comprises:

means for saving the context of the device currently in the device, said context being the context of the device with respect to the process which last accessed the device prior to the process switch;

means for setting the corresponding valid bits of the pages of the process address space to which the device is mapped in the process address space of the process which accesses the device subsequent to the process switch;

means for resetting the valid bits of the pages of the inactive process address space to which the device is mapped with respect to the process which last accessed the device prior to the process switch.

9. A multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one user-defined device which is connected to the system through a memory management unit (MMU), said device being mapped into the process address space of each process which may access the device, said process address space comprising segments, said segments comprising at least one page, each page having a corresponding valid bit that invokes a page fault if the bit is not set and an attempt is made to access the address space each of said segments having a page fault handler associated with it, said system further comprising a means for providing the time sharing of the user defined device, said means comprising:

means for controlling the mapping of the context of the user-defined device with respect to a particular process, such that each mapping of a device with respect to a process is mapped into separate segments of the respective process address space;

means for controlling the state of the valid bits of the pages of each of the processes address space to which the device is mapped, such that the valid bits are initially reset;

means for determining that a page fault occurs because a process has attempted to access a device mapped to a page;

if a page fault occurs, means for enabling the page fault handler of the segment within which the page fault occurred, said page fault handler indicating the steps to be taken to perform a context switch;

means for performing a context switch as indicated by page fault handler comprising;

means for setting the valid bits of the pages of the process address space to which the device is mapped with respect to the process which is attempting to access the device, whereby subsequent attempts to access by the process do not cause a page fault;

means for restoring the context of the process attemping to access the device whereby the device resumes execution in the context of the process attempting to access the device; and means for controlling the means for restoring, such that the context of the device with respect to the process attempting to access the device is restored on the device only if the device context on the device is not the device context with respect to the process attempting to access the device;

means for saving the context of the device with respect to the process the next time a process switch occurs and the process is no longer executed by the CPU; and when the next process switch occurs, means for resetting the valid bits of the pages of the address space to which the device is mapped with respect to the process the CPU executes prior to the process switch, so that subsequent attempts to access by the process cause a page fault;

whereby multiple processes can share a single device.

10. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one user-defined device which is connected to the system through a memory management unit (MMU), said device executing commands issued by the CPU, said being mapped into the process address space of each process which may access the device, said process address space comprising pages, each page having a corresponding valid bit that invokes a page fault if the bit is not set an attempt is made to access the address space, a process for providing the time sharing of the user defined device, a method for performing context switching comprising the steps of:

mapping the device in each process address space in a manner that each device is mapped into at least one page;

resetting the valid bits of the pages of each of the process address space to which the device is mapped;

determining that a page fault occurs because a process has attempted to access the device mapped to a page in the process address space;

performing a context switch of the device when a page fault occurs due to a process attempting to access the device, comprising the steps of:

restoring on the device the context of the device with respect to the process attempting to access the device whereby the device resumes execution in the context of the process which attempted to access the device;

permanently setting the corresponding valid bits in the pages of the process address space to which the device is mapped such that subsequent attempts by the process to access the device do not cause a page fault;

performing a context switch when a process switch occurs comprising the steps of:

saving the context of the device with respect to the process, executed by the CPU prior to the process switch;

restoring on the device the context of the device with respect to the process, which is executed by CPU subsequent to the process switch;

whereby after a page fault occurs, a context switch will be performed with respect to the process each time a process switch occurs.

11. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one user-defined device which is connected to the system through a memory management unit (MMU), said device being mapped into the process address space of each process which may access the device, said process address space comprising pages, each page having a valid bit that involes a page fault if the bit is not set and an attempt is made to access the address space, a process for providing the time sharing of the user defined device, said means comprising the steps of:

mapping the device in each process address space in a manner that each device is mapped into at least one page;

resetting the corresponding valid bits of the pages of each of the process address space to which the device is mapped;

determining that a page fault occurs because a process has attempted to access a device mapped to a page in a process address space and the corresponding valid bit is reset;

performing a context switch of the device when a page fault occurs due to a process attempting to access a device and the corresponding valid bit is reset, comprising the steps of:

restoring on the device the context of the device with respect to the process attemping to access the device whereby the device resumes execution in the context of the process which attempted to access the device;

setting the corresponding valid bits of the page of the process address space to which the device is mapped with respect to the process attempting to access the device such that subsequent attempts to access the device do not cause a page fault; when the next process switch occurs;

saving the context of the device with respect to the process executed by the CPU prior to the process switch; and resetting the valid bits of the pages of the process address space to which the device is mapped with respect to the process executed by the CPU prior to the process switch, such that subsequent attempts to access by the process cause a page fault.

12. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one user-defined device which is connected to the system through a memory management unit (MMU), said device being mapped into the process address space of each process which may access the device, said process address space comprising pages, each page having a corresponding valid bit that invokes a page fault if the bit is not set and an attempt is made to access the address space, a process for providing the time sharing of the user defined device, said means comprising the steps of:

mapping the device in each process address space in a manner that each device is mapped into at least one page;

resetting the corresponding valid bits of the pages of each of the process address space to which the device is mapped;

determining that a page fault occurs because a process has attempted to access a device mapped to a page in a process address space and the corresponding valid bit is reset;

performing a context switch of the device when a page fault occurs due to a process attempting to access a device, comprising the steps of:

determining if the context on the device is the device context with respect to the process attempting to access the device;

if the device context on the device is not the device context with respect to the process attempting to access the device, restoring on the device the context of the device with respect to the process attempting to access the device;

setting the valid bits of the pages of the process address space to which the device is mapped with respect to the process attempting to access the device such that subsequent attempts to access by the process do not cause a page fault;

resuming device execution in the context of the process which attempted to access the device;

when a process switch occurs, saving the context of the device with respect to the process which is executed by the CPU prior to the process switch and resetting the valid bits of the pages of the process address space to which the device is mapped with respect to the process attempting to access the device such that subsequent attempts to access the device by the process causes a page fault.

13. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one user-defined device which is connected to the system through a memory management unit (MMU), said device being mapped into the process address space of each process which may access the device, said process address space comprising pages, each page having a corresponding valid bit that invokes a page fault if the bit is not set and an attempt is made to access the address space, a process for providing the time sharing of the user defined device, said means comprising the steps of:

mapping the device in each process address in a manner that each device is mapped into at least one page;

resetting the corresponding valid bits of the pages of each of the process address space to which the device is mapped;

determining that a page fault occurs because a process has attempted to access the device mapped to a page in the process address space;

performing a context switch of the device when a page fault occurs due to a process attempting to access a device, comprising the steps of:

saving the context of the device currently in the device with respect to the process which las accessed the device;

restoring on the device the context of the device with respect to the process attempting to access the device whereby the device resumes execution in the context of the process which attempted to access the device;

setting the valid bits of the pages of the process address space to which the device is mapped with respect to the process attempting to access the device; and resetting the valid bits of the pages of the process address space to which the device is mapped with respect to the process which last accessed the device.

14. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one device which is connected to the system through a memory management unit (MMU), said device being mapped into the process address space of each process which may access the device, said process address space comprising pages which are grouped into segments, each of said pages having a corresponding valid bit that invokes a page fault if the bit is not set and an attempt is made to access the address space, each of said segments having a page fault handler associated with it which is invoked when a page fault occurs in the segment, a method for controlling said device comprising the steps of:

mapping the device in each process address space such that each device is mapped into a separate segment whereby processes access the device through the address the device is mapped to in its process address space;

initially resetting the valid bits of the pages of each of the segments located in the process address space to which the device is mapped;

initializing the page fault handler to perform a context switch of the device, said context switch comprising the steps of:

saving the context currently in the device;

restoring on the device the context of the device with respect to the process attempting to access the device, and setting the corresponding valid bits of the process address space with respect to the process attempting to access the device whereby the device resumes execution in the context of the process attempting to access the device;

when a process switch occurs, resetting the corresponding valid bits of a process executed by the CPU prior to the process switch whereby the process will cause a page fault when an attempt is made to access the device;

determining that a page fault occurs because a process has attempted to access a device mapped in its address space and the corresponding valid bits are reset, whereby the page fault handler is invoked to perform the context switch of the device;

whereby the device and access to the device are controlled by setting and resetting the valid bits of the pages to which the device is mapped such that when a process attempts to access the device and the corresponding valid bits are reset, a page fault occurs and the page fault handler is invoked which executes predetermined tasks to perform the context switching of the device.

15. In a multi-tasking system in which multiple processes are executed by a central processing unit (CPU) of the system on a time-shared basis using context switching, the context of the CPU being the state of the CPU with respect to a particular process, the switching of the CPU from one process to another process referred to as process switching, said system further comprising at least one device which is connected to the system through a memory management unit (MMU), said device being mapped into the process address space of each process which may access the device, said process address space comprising pages, each page having a corresponding valid bit that invokes a page fault if the bit is not set and an attempt is made to access the address space, a method for providing the time sharing of the user defined device, said method comprising the steps of:

mapping the device in each process address space in a manner that each device is mapped into at least one page;

resetting the corresponding valid bits of the pages of each of the process address space to which the device is mapped;

determining that a page fault occurred because a process has attempted to access the device mapped to a page in a process address space and the corresponding valid bit is reset;

performing a context switch of the device when a page fault occurs due to a process attempting to access the device and the corresponding valid bit is reset, comprising the steps of:

restoring on the device the context of the device with respect to the process attempting to access the device;

setting the corresponding valid bit of the process attempting to access the device such that subsequent attemps to access the device by the process do not cause a page fault;

whereby the process attempting to access the device can access the device and the device resumes execution in the context of the process which attempted to access the device.

16. The method of claim 15 wherein the means for performing a context switch of the device further comprises the steps of:

when the next process switch occurs and the process is no longer executed by the CPU;

saving the context of the device with respect to the process which is executed by the CPU prior to process switch; and resetting valid bits of the pages of the process address space to which the device is mapped with respect to the process which is executed by the CPU prior to the process switch such that subsequent attempts to access by the process cause a page fault.

17. The method of claim 16, wherein the step of restoring on the device comprises restoring on the device only if the device context currently on the device is not the device context with respect to the process attempting to access the device.

18. The method of claim 15 wherein the step of performing a context switch further comprises prior to the step of restoring the context, reading the context currently in the device and storing the context.

19. The method of claim 15, further comprising the steps of;

grouping pages according to segments;

providing a page fault handler associated with each segment, said page fault handler controlling the step of performing a context switch for the device;

wherein the step of mapping further comprising mapping in such a manner that each device is mapped into one segment;

whereby when a page fault occurs, the page fault handler causes a context switch of the device to be performed.

20. The multi-tasking system of claim 15, further comprising the steps of:

performing a context switch when a process switch occurs comprising the steps of;

if the process is a process that is executed by the CPU prior to the process switch, saving the context of the device with respect to the process; and if the process is a process that is executed by the CPU subsequent to the process switch, when the process switch occurs, restoring on the device the context of the device with respect to the process;

resetting the corresponding valid bits of the pages of the process address space to which the device is mapped of the process executed by the CPU prior to the process switch.

21. The method of claim 15, wherein the step of performing a context switch further comprises the steps of:

saving the context of the device currently in the device, said context being the context of the device with respect to the process which last accessed the device prior to the process switch;

setting the corresponding valid bits of the pages of the process address space to which the device is mapped with respect to the process which accessed the device subsequent to the process switch;

resetting the valid bits of the pages of the process address space to which the device is mapped with respect to the process which last accessed the device prior to the process switch.

* * * * *